(12) United States Patent
Fu et al.

(10) Patent No.: US 12,418,857 B2
(45) Date of Patent: Sep. 16, 2025

(54) CELL ACCESS METHODS, ELECTRONIC DEVICE AND STORAGE MEDIUM

(71) Applicant: GUANGDONG OPPO MOBILE TELECOMMUNICATIONS CORP., LTD., Guangdong (CN)

(72) Inventors: Zhe Fu, Dongguan (CN); Haitao Li, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 569 days.

(21) Appl. No.: 17/859,118

(22) Filed: Jul. 7, 2022

(65) Prior Publication Data

US 2022/0353804 A1    Nov. 3, 2022

Related U.S. Application Data

(63) Continuation of application No. PCT/CN2020/073040, filed on Jan. 19, 2020.

(51) Int. Cl.
*H04W 48/18*   (2009.01)
*H04W 74/08*   (2009.01)
*H04W 74/0833* (2024.01)

(52) U.S. Cl.
CPC ....... *H04W 48/18* (2013.01); *H04W 74/0841* (2013.01); *H04W 74/0875* (2013.01)

(58) Field of Classification Search
None
See application file for complete search history.

(56) References Cited

U.S. PATENT DOCUMENTS

| | | | | |
|---|---|---|---|---|
| 11,265,779 | B2* | 3/2022 | Han | H04W 74/004 |
| 2018/0249513 | A1* | 8/2018 | Chang | H04W 28/00 |
| 2020/0077327 | A1* | 3/2020 | Duan | H04W 76/11 |
| 2020/0120580 | A1* | 4/2020 | Jin | H04W 48/18 |
| 2020/0314732 | A1* | 10/2020 | Park | H04L 5/0055 |
| 2021/0092725 | A1* | 3/2021 | Park | H04W 76/27 |
| 2021/0410107 | A1* | 12/2021 | Park | H04W 68/02 |

FOREIGN PATENT DOCUMENTS

| | | |
|---|---|---|
| CN | 106851589 A | 6/2017 |
| CN | 109845338 A | 6/2019 |
| EP | 3343980 A1 | 7/2018 |

(Continued)

OTHER PUBLICATIONS

Examination Report for European Application No. 20913850.2 Issued Mar. 15, 2024, 5 Pages.

(Continued)

*Primary Examiner* — Kodzovi Acolatse
(74) *Attorney, Agent, or Firm* — PERKINS COIE LLP

(57) ABSTRACT

Disclosed is a cell access method, including: a terminal device receiving the correlation between network slice information supported by a serving cell and random access channel (RACH) parameters, wherein the network slice information includes single network slice selection assistance information (S-NSSAI) or an S-NSSAI combination; and the terminal device performing cell access on the basis of the correlation. Further disclosed are another cell access method, an electronic device and a storage medium.

17 Claims, 3 Drawing Sheets

(56) References Cited

FOREIGN PATENT DOCUMENTS

| | | |
|---|---|---|
| EP | 3589064 A1 | 1/2020 |
| WO | 2018161803 A1 | 9/2018 |
| WO | 2019042186 A1 | 3/2019 |

OTHER PUBLICATIONS

International Search Report Mailed Oct. 28, 2020 In Application No. PCT/CN2020/073040, 4 pages.
Written Opinion Mailed Oct. 28, 2020 In Application No. PCT/CN2020/073040, 7 pages.
Extended European Search Report for European Application No. 20913850.2 issued Oct. 10, 2022. 7 pages.
First Office Action of the European application No. 20913850.2, issued on Jun. 16, 2023. 6 pages.
The second examination report of the European application No. 20913850.2, issued on Nov. 22, 2023. 6 pages.
Fourth Examination Report for European Application No. 20913850.2 Issued Jul. 17, 2024, 5 Pages.

\* cited by examiner

… (1)

CELL ACCESS METHODS, ELECTRONIC DEVICE AND STORAGE MEDIUM

CROSS-REFERENCE TO RELATED APPLICATION

The present application is a continuation application of International PCT Application No. PCT/CN2020/073040, filed on Jan. 19, 2020, the entire content of which is hereby incorporated by reference.

TECHNICAL FIELD

The present disclosure relates to the field of wireless communication technology, in particular to a method for cell access, an electronic device, and a storage medium.

BACKGROUND

In the related art, it is not clear how a network device can provide a suitable network slice for a terminal device, after a network slice is introduced to a Radio Access Network (RAN) side.

SUMMARY

Implementations of the present disclosure provide a method for cell access, an electronic device, and a storage medium, so that a network device can know a network slice needed by a terminal device.

In a first aspect, an implementation of the present disclosure provides a method for cell access, including: receiving, by a terminal device, a correspondence relation between network slice information supported by a serving cell and Random Access Channel (RACH) parameters, the network slice information including Single Network Slice Selection Assistance Information (S-NSSAI) or an S-NSSAI combination; and performing, by the terminal device, cell access based on the correspondence relation.

In a second aspect, an implementation of the present disclosure provides a method for cell access, including: sending, by a network device, a correspondence relation between network slice information supported by a serving cell and RACH parameters to a terminal device, the network slice information including S-NSSAI or an S-NSSAI combination.

In a third aspect, an implementation of the present disclosure provides a terminal device, including: a first receiving unit configured to receive a correspondence relation between network slice information supported by a serving cell and RACH parameters, the network slice information including S-NSSAI or an S-NSSAI combination; and a first processing unit configured to perform cell access based on the correspondence relation.

In a fourth aspect, an implementation of the present disclosure provides a network device, including: a second sending unit configured to send a correspondence relation between network slice information supported by a serving cell and RACH parameters to a terminal device, the network slice information including S-NSSAI or an S-NSSAI combination.

In a fifth aspect, an implementation of the present disclosure provides a terminal device, including: a processor, and a memory configured to store a computer program that is runnable on the processor, wherein the processor is configured to perform acts of the method for cell access performed by the above terminal device when the computer program is run.

In a sixth aspect, an implementation of the present disclosure provides a network device, including: a processor, and a memory configured to store a computer program that is runnable on the processor, wherein the processor is configured to perform acts of the method for cell access performed by the above network device when the computer program is run.

In a seventh aspect, an implementation of the present disclosure provides a chip, including: a processor, configured to call and run a computer program from a memory to cause a device installed with the chip to perform the method for cell access performed by the above terminal device.

In an eighth aspect, an implementation of the present disclosure provides a chip, including: a processor, configured to call and run a computer program from a memory to cause a device installed with the chip to perform the method for cell access performed by the above network device.

In a ninth aspect, an implementation of the present disclosure provides a storage medium, storing an executable program, when the executable program is executed by a processor, the method for cell access performed by the above terminal device being implemented.

In a tenth aspect, an implementation of the present disclosure provides a storage medium, storing an executable program, when the executable program is executed by a processor, the method for cell access performed by the above network device being implemented.

In an eleventh aspect, an implementation of the present disclosure provides a computer program product, including computer program instructions that enable a computer to implement the method for cell access performed by the above terminal device.

In a twelfth aspect, an implementation of the present disclosure provides a computer program product, including computer program instructions that enable a computer to implement the method for cell access performed by the above network device.

In a thirteenth aspect, an implementation of the present disclosure provides a computer program, which enables a computer to implement the method for cell access performed by the above terminal device.

In a fourteenth aspect, an implementation of the present disclosure provides a computer program, which enables a computer to implement the method for cell access performed by the above network device.

The method for cell access, the electronic device and the storage medium provided by the implementations of the present disclosure include: receiving, by a terminal device, a correspondence relation between network slice information supported by a serving cell and RACH parameters, the network slice information including S-NSSAI or an S-NSSAI combination; and performing, by the terminal device, cell access based on the correspondence relation. In this way, a network device can know the network slice needed by the terminal device, so that the network device can provide more network slicing services for the terminal device.

DETAILED DESCRIPTION

Figure 1:
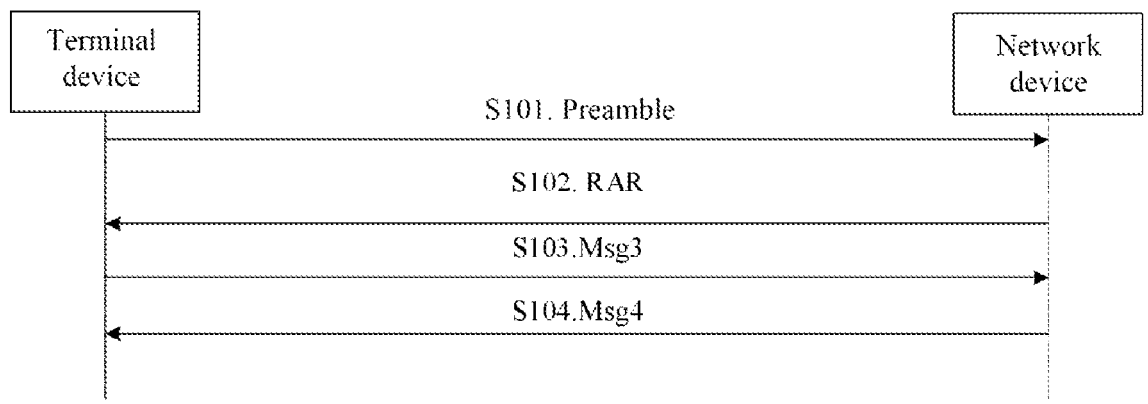
FIG. 1 is a schematic diagram of a processing flow of a second type of random access according to the present disclosure.

In order to understand features and technical contents of implementations of the present disclosure in more detail, implementation modes of the implementations of the present disclosure will be described in detail below in combination with accompanying drawings, which are for reference and description only, but are not intended to limit the implementations of the present disclosure.

Before a detailed description is made on a method for cell access according to an implementation of the present disclosure, a brief description is made on the related art.

At present, with people's pursuit of speed, delay, high-speed mobility and energy efficiency, and diversity and complexity of services in the future life, the 3rd Generation Partnership Project (3GPP) International Organization for Standard has begun to research and develop the 5th-generation (5G) communication. Main application scenarios of the 5G are: Enhance Mobile Broadband (eMBB), Ultra Reliable Low Latency Communications (URLLC), and Massive Machine Type Communication (mMTC).

A New Radio (NR) system may also be deployed independently. In order to reduce air interface signaling, quickly resume a wireless connection and quickly resume a data service, a new Radio Resource Control (RRC) state, i.e., an RRC-Inactive state, is defined. In an RRC_Idle state, mobility is a terminal device-based cell reselection, paging is initiated by a Core Network (CN), and a paging area is configured by the CN. There is neither terminal device context nor RRC connection on the network device side. In an RRC_Inactive state, mobility is a terminal device-based cell reselection, there is a connection between a CN and an NR, there is a terminal device context on a certain network device, paging is triggered by RAN, an RAN-based paging area is managed by the RAN, and the location of the terminal device that can be known by the network device is on a level of the RAN-based paging area. In an RRC-Connected state, there is an RRC connection, there is a terminal device context between the network device and the terminal device, and the location of the terminal device known by the network device is on a level of specific cell; and mobility is the mobility controlled by the network device, and unicast data may be transmitted between the network device and the terminal device.

In the NR system, an RACH process includes: a first type of random access and a second type of random access. In the first type of random access, information interaction needs to be performed twice between the terminal device and the network device. Therefore, the first type of random access is also called 2-step RACH. In the second type of random access, information interaction needs to be performed four times between the terminal device and the network device. Therefore, the second type of random access is also called 4-step RACH. Depending on the mode of random access, random access includes contention-based random access and non-contention-based random access. Depending on the type of random access, random access includes the first type of random access and the second type of random access. The following is a brief description of the first type of random access and the second type of random access respectively.

The processing flow of the second type of random access, as shown in FIG. 1, includes the following four acts.

In act S101, a terminal device sends a random access Preamble to a network device through Msg1.

The terminal device sends a selected Preamble on a selected PRACH time domain resource; and the network device can estimate, according to the Preamble, uplink Timing and a size of an uplink grant needed by the terminal device to transmit Msg3.

In act S102, after detecting that there is a terminal device sending a Preamble, the network device sends a Random Access Response (RAR) message to the terminal device through Msg2 to inform the terminal device of uplink resource information that may be used when sending Msg3, assigns a temporary Radio Network Tempory Identity (RNTI) to the terminal device, and provides a time advance command and the like to the terminal device.

In act S103, after receiving the RAR message, the terminal device sends Msg3 in an uplink resource specified by the RAR message.

The message Msg3 is mainly used to inform the network device what event triggers the RACH process. For example, if it is an initial random access event, a terminal device ID and an establishment cause may be carried in Msg3; and if it is an RRC reestablishment event, a connected-state terminal device identity and an establishment cause may be carried in Msg3.

Moreover, with the ID carried by Msg3, a contention conflict may be resolved in act S104.

In act S104, the network device sends Msg4 to the terminal device, the Msg4 including a contention resolution message, and assigns an uplink transmission resource to the terminal device.

Upon receiving the Msg4 sent by the network device, the terminal device may detect whether a terminal device-specific temporary identity sent by the terminal device in the Msg3 is contained in a contention resolution message sent by a base station. If yes, it is indicated that the random access procedure of the terminal device succeeds; otherwise, it is considered that the random access procedure fails, and the terminal device needs to initiate a random access procedure starting from a first act again.

Another role of Msg4 is to send a Radio Resource Control (RRC) configuration message to the terminal device.

Figure 2:
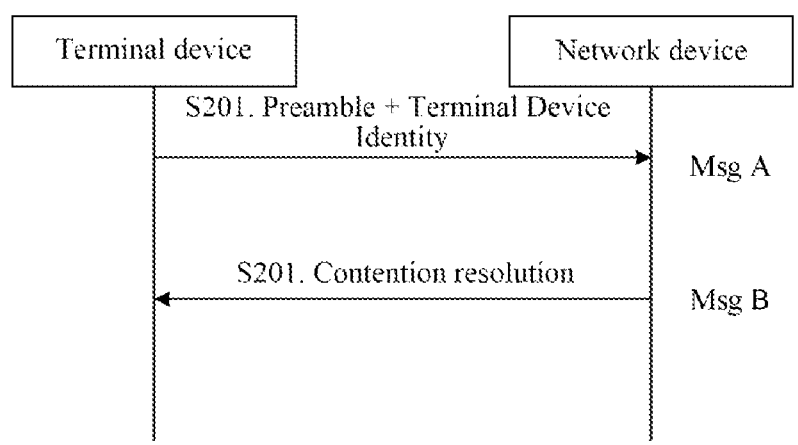
FIG. 2 is a schematic diagram of a processing flow of a first type of random access according to the present disclosure.

The above second type of RACH needs to be completed through four times of information interaction between the network device and the terminal device, resulting in a high delay of the RACH procedure. In order to solve the problem of the high delay of the RACH procedure, a first type of random access is proposed. The processing flow of the first type of random access, as shown in FIG. 2, includes the following acts S201-S202.

In act S201, a terminal device sends MsgA to a network device.

MsgA consists of Preamble and payload. Optionally, the Preamble is the same as the Preamble in the second type of random access, and the Preamble is transmitted over a PRACH resource; information carried by payload is the same as information in the Msg3 in the second type of random access, e.g., RRC signaling when RRC is in an idle state and C-RNTI when RRC is in a connected state, and payload may be transmitted by a Physical Uplink Shared Channel (PUSCH).

The results of receiving MsgA by the network device may include the following two: 1. the network device successfully decodes one or more Preambles; and 2. the network device successfully decodes one or more Preambles and one or more payloads.

In act S202, the terminal device receives MsgB sent by the network device.

Optionally, the MsgB includes contents of Msg2 and Msg4 in the second type of random access.

One type of configuration information for RACH is as follows:

```
RACH-ConfigCommon information element
-- ASN1START
-- TAG-RACH-CONFIGCOMMON-START
RACH-ConfigCommon ::=            SEQUENCE {
    rach-ConfigGeneric               RACH-ConfigGeneric,
    totalNumberOfRA-Preambles                               INTEGER   (1..63)
OPTIONAL,     -- Need S
    ssb-perRACH-OccasionAndCB-PreamblesPerSSB   CHOICE {
        oneEighth                                           ENUMERATED
{n4, n8, n12, n16, n20, n24, n28, n32, n36, n40, n44, n48, n52, n56, n60, n64},
        oneFourth                                           ENUMERATED
{n4, n8, n12, n16, n20, n24, n28, n32, n36, n40, n44, n48, n52, n56, n60, n64},
        oneHalf                                             ENUMERATED
{n4, n8, n12, n16, n20, n24, n28, n32, n36, n40, n44, n48, n52, n56, n60, n64},
        one                                                 ENUMERATED
{n4, n8, n12, n16, n20, n24, n28, n32, n36, n40, n44, n48, n52, n56, n60, n64},
        two                                                 ENUMERATED
{n4, n8, n12, n16, n20, n24, n28, n32},
        four                            INTEGER (1..16),
        eight                           INTEGER (1..8),
        sixteen                         INTEGER (1..4)
    }
OPTIONAL,      -- Need M
    groupBconfigured                 SEQUENCE {
            ra-Msg3SizeGroupA       ENUMERATED {b56, b144, b208, b256, b282,
b480, 6640,
                                                                b800, b1000, b72, spare6,
spared, spared, spare3, spare2, spare1},
            messagePowerOffsetGroupB    ENUMERATED { minusinfinity, dB0, dB5, dB8,
dB10, dB12, dB15, dB18},
            numberOfRA-PreamblesGroupA   INTEGER (1..64)
    }
OPTIONAL,      -- Need R         ENUMERATED { sf8, sf16, sf24, sf32, sf40,
    ra-Content i onRe solutionTimer
sf48, sf56, sf64},
    rsrp-ThresholdSSB                                         RSRP-Range
OPTIONAL,      -- Need R                                      RSRP-Range
    rsrp-ThresholdSSB-SUL
OPTIONAL,      -- Cond SUL       CHOICE {
    prach-RootSequenceIndex
        1839                            INTEGER (0..837),
        1139                            INTEGER (0..137)
    },
    msg1-SubcarrierSpacing                                  SubcarrierSpacing
OPTIONAL,      -- Cond L139                         ENUMERATED {unrestrictedSet,
    restrictedSetConfig
restrictedSetTypeA, restrictedSetTypeB},                  ENUMERATED {enabled}
    msg3-transformPrecoder
OPTIONAL,      -- Need R
    ...
}
-- TAG-RACH-CONFIGCOMMON-STOP
-- ASN1STOP
```

One type of configuration information for RACH is as follows:

```
RACH-ConfigGeneric information element
-- ASN1START
-- TAG-RACH-CONFIGGENERIC-START
RACH-ConfigGeneric ::=          SEQUENCE {
    prach-ConfigurationIndex        INTEGER (0..255),
    msg1-FDM                        ENUMERATED {one, two, four, eight},
    msg1-FrequencyStart                                     INTEGER
(0..maxNrofPhysicalResourceBlocks-1),
    zeroCorrelationZoneConfig       INTEGER (0..15),
    preambleReceivedTargetPower     INTEGER (-202..-60),
    preambleTransMax                ENUMERATED {n3, n4, n5, n6, n7, n8, n10, n20, n50, n100, n200},
    powerRampingStep                ENUMERATED {dB0, dB2, dB4, dB6},
    ra-ResponseWindow                   ENUMERATED {sl1, sl2, sl4, sl8, sl10, sl20, sl40, sl80},
    ...
}
-- TAG-RACH-CONFIGGENERIC-STOP
-- ASN1STOP
```

The strong demand for wireless communications in vertical industries is obvious to all. In order to meet the needs of vertical industries in terms of delay, mobility, reliability and location accuracy, etc., Radio Access Network (RAN) needs to be enhanced on how to support vertical services in an access network. One way to enhance the access network's support for vertical services is to provide services with lower delay, more targeting, greater flexibility and higher scalability for multiple services with different requirements based on network slicing. More specifically, RAN slicing allows application providers to participate in customizing the design, deployment, and operation of RAN to better support the application providers' services. Therefore, enhancement on slicing by the access network is introduced into Release 17 (Rel-17), which specifically relates to the following aspects.

The study item aims to investigate enhancement on RAN support of network slicing. Detailed objectives of the study item are:

1. Study mechanisms to enable UE fast access to the cell supporting the intended slice, including [RAN2]
   a. Slice based cell reselection under network control
   b. Slice based RACH configuration or access barring
   Note: whether the existing mechanism can meet this scenario or requirement can be studied.

The network slicing in Release 15 (Rel-15) involves only the core network side. Specifically, the terminal device reports its own network slicing requirement to the network device, and the network device selects an appropriate Access and Mobility Management Function (AMF) entity according to the network slicing requirement reported by the terminal device, so as to establish a service session between the terminal device and the network device.

At present, the RAN side defines S-NSSAI for each network slice, the terminal device maintains one NSSAI, NSSAI is an S-NSSAI list, and the S-NSSAI list includes at most eight S-NSSAIs.

After a network slice is introduced in the RAN side, the network slices supported by different cells may be different, and the AMF entities corresponding to different network slices may also be different. Therefore, it is necessary to assist the network device to effectively select a suitable AMF entity so that the network device can configure a network slice needed by the terminal device for the terminal device.

The method for cell access according to an implementation of the present disclosure may be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks (WLAN), wireless fidelity (WiFi), a next generation communication system, or other communication systems, etc.

Generally speaking, the traditional communication system supports a limited quantity of connections, and is also easy to implement. However, with the development of communication technology, the mobile communication systems will not only support traditional communication, but also support, for example, the device to device (D2D) communication, the machine to machine (M2M) communication, the machine type communication (MTC), the vehicle to vehicle (V2V) communication, etc., and the implementations of the present disclosure may also be applied to these communication systems.

System architectures and service scenarios described in the implementations of the present disclosure are intended to illustrate the technical solutions of the implementations of the present disclosure more clearly, but do not constitute a limitation to the technical solutions provided by the implementations of the present disclosure. Those of ordinary skills in the art may know that with evolvement of network architectures and emergence of new service scenarios, the technical solutions provided by the implementations of the present disclosure are also applicable to similar technical problems.

The network device involved in an implementation of the present disclosure may be an ordinary base station (such as a NodeB, or an eNB, or a gNB), a new radio controller (NR controller), a centralized unit, a new radio base station, a radio remote module, a micro base station, a relay, a distributed unit, a transmission reception point (TRP), a transmission point (TP), or any other device. An implementation of the present disclosure does not limit the specific technology and the specific device form used by the network device. For convenience of description, in all implementations of the present disclosure, the above-mentioned apparatuses for providing wireless communication functions for a terminal device are collectively referred to as network devices.

In an implementation of the present disclosure, a terminal device may be any terminal, for example, the terminal device may be a user device for machine type communication. That is, the terminal device may also be referred to as User Equipment (UE), a Mobile Station (MS), a mobile terminal, a terminal, etc., which may communicate with one or more core networks via a radio access network (RAN). For example, the terminal device may be a mobile phone (or "cellular" phone), a computer with a mobile terminal, etc. For example, the terminal devices may also be portable, pocket-size, handheld, computer-built or vehicle-mounted mobile devices that exchange speech and/or data with wireless access networks. No specific limitation is made in the implementations of the present disclosure.

Optionally, the network device and the terminal device may be deployed on land, including indoors or outdoors, hand-held or vehicle-mounted; or may be deployed on a water surface; or may be deployed on a plane, a balloon, or a satellite in the air. The implementations of the present disclosure do not limit application scenarios of the network device and the terminal device.

Optionally, communications between a network device and a terminal device and between terminal devices may be performed through a licensed spectrum, or through an unlicensed spectrum, or through a licensed spectrum and an unlicensed spectrum at the same time. Communications between a network device and a terminal device and between terminal devices may be performed through a spectrum of 7 gigahertz (GHz) or below, or through a spectrum of 7 GHz or above, or through a spectrum of 7 gigahertz (GHz) or below and a spectrum of 7 GHz or above at the same time. The implementations of the present disclosure do not limit the spectrum resources used between the network device and the terminal device.

Generally speaking, the traditional communication system supports a limited quantity of connections, and is also easy to implement. However, with the development of communication technology, the mobile communication systems will not only support traditional communication, but also support, for example, the device to device (D2D) communication, the machine to machine (M2M) communication, the machine type communication (MTC), the vehicle to vehicle (V2V) communication, etc., and the implementations of the present disclosure may also be applied to these communication systems.

Figure 3:
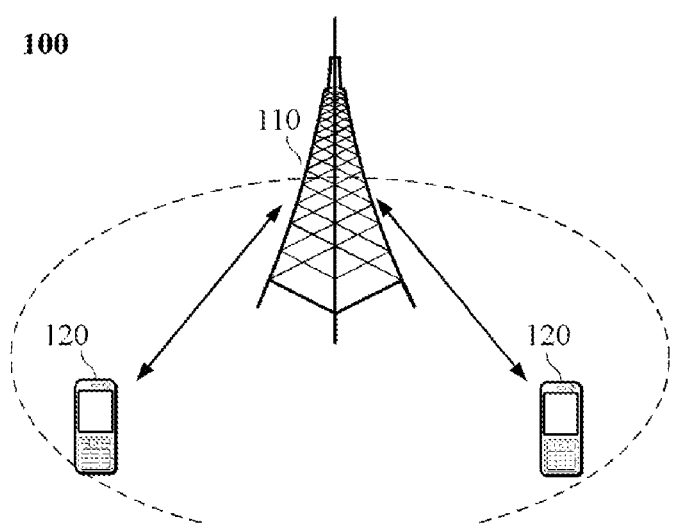
FIG. 3 is a schematic diagram of a composition structure of a communication system according to an implementation of the present disclosure.

Illustratively, a communication system 100 to which an implementation of the present disclosure is applied is shown in FIG. 3. The communication system 100 may include a network device 110. The network device 110 may be a device that communicates with a terminal device 120 (or referred to as communication terminal, or terminal). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 also includes at least one terminal device 120 located within the coverage range of the network device 110. As used herein, the term "terminal device" includes, but is not limited to, a device configured to connect via a wired line, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, and an AM-FM broadcast transmitter; and/or an apparatus, of another terminal device, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but are not limited to, a satellite or cellular telephone, a Personal Communications System (PCS) terminal capable of combining a cellular wireless telephone and data processing, faxing, and data communication abilities, a PDA that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may refer to an access terminal, User Equipment (UE), a subscriber unit, a subscriber station, a mobile station, a rover station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, the 5G system or 5G network may also be referred to as a New Radio (NR) system or an NR network.

FIG. 3 illustrates one network device and two terminal devices. Optionally, the communication system 100 may include multiple network devices, and other quantity of terminal devices may be included within the coverage range of each network device, which is not limited in the implementations of the present disclosure.

Optionally, the communication system 100 may also include other network entities, such as a network controller, a mobile management entity, etc., which is not limited in the implementations of the present disclosure.

It should be understood that a device with a communication function in a network/system in the implementations of the present disclosure may be referred to as a communication device. Taking the communication system 100 shown in FIG. 3 as an example, the communication device may include a network device 110 and terminal devices 120 which have communication functions, and the network device 110 and the terminal devices 120 may be the specific devices described above, which will not be described repeatedly herein. The communication device may also include other devices in the communication system 100, for example, other network entities, such as a network controller and a mobile management entity, which is not limited in the implementations of the present disclosure.

Figure 4:
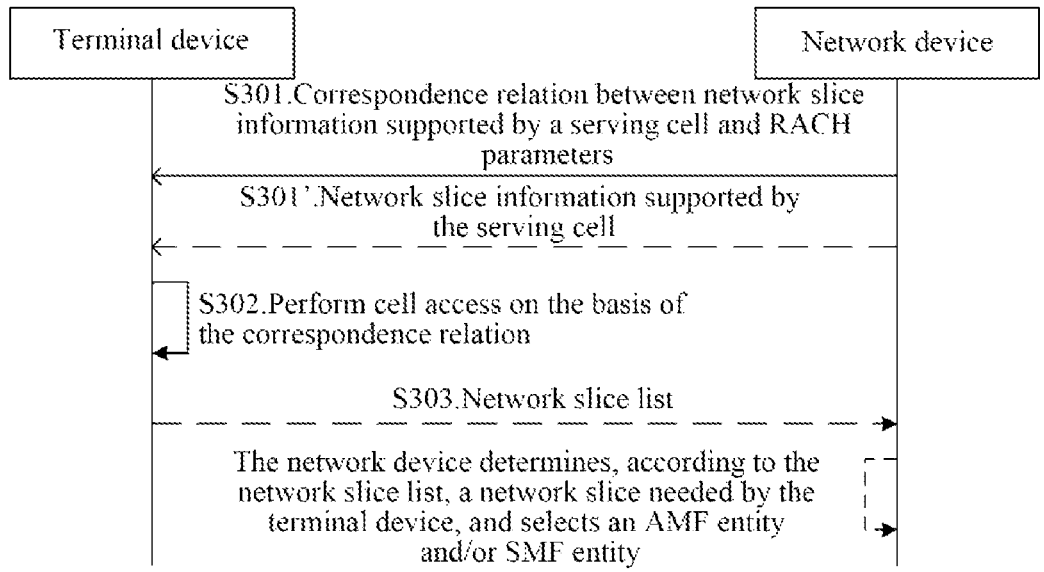
FIG. 4 is a schematic diagram of an optional processing flow of a method for cell access according to an implementation of the present disclosure.

An optional processing flow of a method for cell access according to an implementation of the present disclosure, as shown in FIG. 4, includes the following acts S301-S302.

In act S301, a terminal device receives a correspondence relation between network slice information supported by a serving cell and RACH parameters.

In some implementations, the network slice information may include S-NSSAI, or an S-NSSAI combination. In the case where the network slice information includes S-NSSAI, the number of S-NSSAIs may be one or more; and in the case where there are multiple S-NSSAIs, the multiple S-NSSAIs may be presented in the form of a list. In the case where the network slice information includes an S-NSSAI combination, one S-NSSAI combination may include more than one S-NSSAI, and two or more S-NSSAIs included in one combination are S-NSSAIs supported by the serving cell at the same time and/or in the same network connection.

In some implementations, the correspondence relation between the network slice information supported by the serving cell and the RACH parameters may be sent by the network device through a servicing cell system broadcast message. For example, the correspondence relation between the network slice information supported by the serving cell and the RACH parameters is carried in an SIB message. The correspondence relation between the network slice information supported by the serving cell and the RACH parameters may be explicitly indicated, for example, the network device directly indicates the correspondence relation between the network slice information supported by the serving cell and the RACH parameters in a signaling sent to the terminal device; for example, indicating the corresponding slice information when configuring the RACH parameter, or indicating the corresponding RACH parameter when configuring the slice information. The correspondence relation between the network slice information supported by the serving cell and the RACH parameters may also be implicitly indicated, with a bit value of 01 corresponding to a first RACH parameter and a bit value of 10 corresponding to a second RACH parameter; or, the first RACH parameter corresponds to a first slice in the network slice information, the second RACH parameter corresponds to a second slice in the network slice information, and so on.

In some implementations, the RACH parameters may include at least one parameter in RACH-ConfigCommon; e.g., totalNumberOfRA-Preambles, ssb-perRACH-OccasionAndCB-PreamblesPerSSB and groupBconfigured. The RACH parameters may also include: at least one parameter in RACH-ConfigGeneric; e.g., prach-ConfigurationIndex, preambleTransMax and ra-ResponseWindow, etc.

In act S302, the terminal device performs cell access based on the correspondence relation.

In some implementations, the method may further include act S301'.

In act S301', the terminal device receives the network slice information supported by the serving cell.

In some implementations, the network slice information supported by the serving cell may be sent by the network device through a serving cell system broadcast message. For example, the network slice information supported by the serving cell is carried in an SIB message.

The correspondence relation between the network slice information supported by the serving cell and the RACH parameters and the network slice information supported by the serving cell may be carried in the same system broadcast message or in different system broadcast messages.

In some implementations, a Non-Access Stratum (NAS) entity of the terminal device indicates an active network slice to an Access Stratum (AS) entity of the terminal device; optionally, the non-access stratum entity informs the access stratum entity through a service request process. The active network slice includes at least one of: a network slice which the non-access stratum of the terminal device indicates to be activated, a network slice which the non-access stratum of the terminal device indicates to be triggered, and a network slice which the non-access stratum of the terminal device indicates to be needed. The network slice supported by the terminal device may be stored in the terminal device.

In some implementations, the method may further include act S303.

In act S303, the terminal device reports a network slice list to the network device.

In some implementations, the terminal device may report the network slice list through a dedicated Radio Resource Control (RRC) signaling. For example, the terminal device reports the network slice list to the network device through an RRC setupComplete message. The network device determines a network slice needed by the terminal device according to the network slice list, and selects an AMF entity and/or a Session Management Function (SMF) entity.

In some implementations, the network slice list includes any of the followings:
1) a network slice included in an intersection of active network slices of the terminal device and network slices supported by the serving cell, which is used for the network device to determine a network slice needed by the terminal device and for the network device to select an appropriate AMF entity and SFM entity;
2) a network slice included in an intersection of network slices supported by the terminal device and the network slices supported by the serving cell;
3) a network slice not supported by the serving cell among the active network slices of the terminal device, which is used for the network device to perform AMF entity switching in a later stage;
4) a network slice not supported by the serving cell among the network slices supported by the terminal device;
5) an active network slice among the network slices supported by the terminal device; and
6) a non-active network slice among the network slices supported by the terminal device, which is used for the network device to select an AMF entity and perform AMF entity switching later.

The method for cell access according to an implementation of the present disclosure is described below for the case where the network slice information includes S-NSSAI and for the case where the network slice information includes an S-NSSAI combination, respectively.

With regard to the case where the network slice information includes S-NSSAI, the performing, by terminal device, cell access based on the correspondence relation, as shown in act S302, may include: performing, by terminal device, cell access based on the correspondence relation between the S-NSSAI supported by the serving cell and the RACH parameters and active network slices of the terminal device.

In specific implementation, the terminal device may randomly select one active network slice from the active network slices, and then determine, based on the correspondence relation between the S-NSSAI supported by the serving cell and the RACH parameters, an RACH parameter corresponding to the selected active network slice. For example, the terminal device determines an S-NSSAI of the selected active network slice, and then determines an RACH parameter according to the correspondence relation between the S-NSSAI supported by the serving cell and the RACH parameters.

The terminal device may also select one active network slice according to a priority order of the active network slices, and then determine, based on the correspondence relation between the S-NSSAI supported by the serving cell and the RACH parameters, an RACH parameter corresponding to the selected active network slice.

The priority order of the active network slices may be indicated to the AS entity by the NAS entity of the terminal device. The priority order of the active network slices may also be determined according to an order of the S-NSSAIs in the S-NSSAI list indicated by the network device, for example, in the S-NSSAI list, the high the rank of S-NSSAI is, the high the priority of S-NSSAI is. The priorities of the network slices may also be stored in the terminal device. The priority of the network slice is determined according to a service triggering order, for example, a network slice corresponding to a service triggered formerly has a higher priority. The priority of the network slice may also be determined according to a service characteristic, for example, the priority of a network slice corresponding to a first service is higher than that of a network slice corresponding to a second service. The priority of the network slice may also be determined according to an indication of the network device.

For example, the active network slices of the terminal device are: S-NSSAI-1, S-NSSAI-2, S-NSSAI-3 and S-NSSAI-4; the priority order of the active network slices of the terminal device is: S-NSSAI-1>S-NSSAI-2>S-NSSAI-3>S-NSSAI-4; and the S-NSSAIs supported by the serving cell are: S-NSSAI-1, S-NSSAI-2 and S-NSSAI-3. The correspondence relation between the S-NSSAIs supported by serving cell and the RACH parameters is: S-NSSAI-1 corresponding to RACH1, S-NSSAI-2 corresponding to RACH2, and S-NSSAI-3 corresponding to RACH3. Since the network slice having the highest priority among the active network slices of the terminal device is S-NSSAI-1 and the serving cell supports the S-NSSAI-1, the terminal device selects the RACH1 parameter corresponding to S-NSSAI-1 to initiate random access.

Thus, the terminal device preferentially selects an RACH parameter corresponding to the network slice with the highest priority among the active network slices to access the network device, which is beneficial for the network device to know the network slice that the terminal device needs to access preferentially. By reporting the network slice list by the terminal device, the network device can know all the network slices supported by the terminal device, which facilitates the network device in selecting an appropriate AMF entity to establish a session connection with the terminal device, thereby providing more network slice services, and improving user experience.

With regard to the case where the network slice information includes an S-NSSAI combination, performing cell access based on the correspondence relation by the terminal device, as shown in act S302, may include: performing, by the terminal device, cell access based on the correspondence relation between S-NSSAI combinations supported by the serving cell and the RACH parameters and the active network slices of the terminal device.

In specific implementation, the terminal device preferentially determines an S-NSSAI combination including the largest number of active network slices among the S-NSSAI combinations supported by the serving cell.

In some implementations, in the case where there are more than one S-NSSAI combinations including the largest number of active network slices among the S-NSSAI combinations supported by the serving cell, the terminal device randomly selects one S-NSSAI combination from the S-NSSAI combinations including the largest number of active network slices, or the terminal device selects one S-NSSAI combination from the S-NSSAI combinations including the largest number of active network slices based on an implementation of the terminal device; and determines an RACH parameter corresponding to the selected S-NSSAI combination based on the correspondence relation between the S-NSSAI combinations supported by the serving cell and the RACH parameters, the RACH parameter being used for cell access.

In some other implementations, in the case where there are more than one S-NSSAI combinations including the largest number of active network slices among the S-NSSAI combinations supported by the serving cell, the terminal device selects one S-NSSAI combination including a network slice with the highest priority from the S-NSSAI combinations including the largest number of active network slices, and determines an RACH parameter corresponding to the selected S-NSSAI combination based on the correspondence relation between the S-NSSAI combinations supported by the serving cell and the RACH parameters, the RACH parameter being used for cell access. Optionally, the combination may be a first S-NSSAI combination.

In some further implementations, in the case where there are more than one S-NSSAI combinations including the largest number of active network slices among the S-NSSAI combinations supported by the serving cell, the terminal device selects one S-NSSAI combination including the largest number of network slices in a first priority range from the S-NSSAI combinations including the largest number of active network slices, and determines an RACH parameter corresponding to the selected S-NSSAI combination based on the correspondence relation between the S-NSSAI combinations supported by the serving cell and the RACH parameters, the RACH parameter being used for cell access. Optionally, the combination may be a first S-NSSAI combination.

For example, there are two S-NSSAI combinations including the largest number of active network slices, which are respectively {S-NSSAI-1, S-NSSAI-2} and {S-NSSAI-2, S-NSSAI-3, S-NSSAI-4}; wherein the priority order of the network slices is: S-NSSAI-1>S-NSSAI-2>S-NSSAI-3>S-NSSAI-4. If the first priority range is 2, i.e., two S-NSSAIs with the highest priority, the first S-NSSAI combination includes S-NSSAI-1 and S-NSSAI-2 in the first priority range, and the second S-NSSAI combination includes S-NSSAI-2 in the first priority range. Therefore, the terminal device selects an RACH parameter corresponding to {S-NSSAI-1, S-NSSAI-2} for cell access.

In some still further implementations, in the case where there are more than one S-NSSAI combinations including the largest number of active network slices among the S-NSSAI combinations supported by the serving cell, the terminal device determines a first S-NSSAI combination including the largest number of network slices supported by the terminal device among the S-NSSAI combinations including the largest number of active network slices, and determines an RACH parameter corresponding to the first S-NSSAI combination based on the correspondence relation between the S-NSSAI combinations supported by the serving cell and the RACH parameters.

For example, there are two S-NSSAI combinations including the largest number of active network slices, which are respectively {S-NSSAI-1, S-NSSAI-2} and {S-NSSAI-2, S-NSSAI-3, S-NSSAI-4}; wherein the network slices supported by the terminal device are S-NSSAI-2 and S-NSSAI-3, then the terminal device selects an RACH parameter corresponding to {S-NSSAI-2, S-NSSAI-3, S-NSSAI-4} for cell access.

In specific implementation, if there are more than one first S-NSSAI combination, the terminal device may randomly select one of the first S-NSSAI combinations as a second S-NSSAI combination, and perform cell access by using an RACH parameter corresponding to the second S-NSSAI combination based on the correspondence relation between the S-NSSAI combinations supported by the serving cell and the RACH parameters. The terminal device may also select one of the first S-NSSAI combinations as a third S-NSSAI combination based on the implementation of the terminal device, and perform cell access by using an RACH parameter corresponding to the third S-NSSAI combination based on the correspondence relation between the S-NSSAI combinations supported by the serving cell and the RACH parameters.

The terminal device may also select one S-NSSAI combination including a network slice with the highest priority from the first S-NSSAI combinations as a fourth S-NSSAI combination, and perform cell access by using an RACH parameter corresponding to the fourth S-NSSAI combination based on the correspondence relation between the S-NSSAI combinations supported by the serving cell and the RACH parameters. For example, the first S-NSSAI combinations include {S-NSSAI-1, S-NSSAI-2} and {S-NSSAI-2, S-NSSAI-3}; wherein S-NSSAI-1 has the highest priority, then the terminal device selects an RACH parameter corresponding to {S-NSSAI-1, S-NSSAI-2} for cell access.

In some still further implementations, the terminal device may also select one S-NSSAI combination including the largest number of network slices in a second priority range from the first S-NSSAI combinations as a fifth S-NSSAI combination, and determine an RACH parameter corresponding to the fifth S-NSSAI combination based on the correspondence relation between the S-NSSAI combinations supported by the serving cell and the RACH parameters, the RACH parameter being used for cell access.

For example, there are two first S-NSSAI combinations, which are respectively {S-NSSAI-1, S-NSSAI-2} and {S-NSSAI-2, S-NSSAI-3, S-NSSAI-4}; wherein the priority order of the network slices is: S-NSSAI-1>S-NSSAI-2>S-NSSAI-3>S-NSSAI-4. If the second priority range is 2, i.e., two S-NSSAIs with the highest priority, the first S-NSSAI combination includes S-NSSAI-1 and S-NSSAI-2 in the second priority range, and the second S-NSSAI combination includes S-NSSAI-2 in the second priority range. Therefore, the terminal device selects an RACH parameter corresponding to {S-NSSAI-1, S-NSSAI-2} for cell access.

The method for cell access in the case where the network slice information includes an S-NSSAI combination is described below by an example.

The S-NSSAIs supported by the terminal device are: S-NSSAI-1, S-NSSAI-2, S-NSSAI-3 and S-NSSAI-4; the active S-NSSAIs of the terminal device are: S-NSSAI-1, S-NSSAI-3 and S-NSSAI-4; and the S-NSSAI combinations supported by the serving cell are: {S-NSSAI-1}, {S-NSSAI-1, S-NSSAI-2}, {S-NSSAI-1, S-NSSAI-3}, {S-NSSAI-2, S-NSSAI-3} and {S-NSSAI-1, S-NSSAI-2, S-NSSAI-3}.

The correspondence relation between the RACH parameters (or resources) supported by the serving cell and the S-NSSAIs is: RACH1 corresponding to {S-NSSAI-1}, RACH2 corresponding to {S-NSSAI-1, S-NSSAI-2}, RACH3 corresponding to {S-NSSAI-1, S-NSSAI-3}, RACH4 corresponding to {S-NSSAI-2, S-NSSAI-3}, and RACH5 corresponding to {S-NSSAI-1, S-NSSAI-2, S-NSSAI-3}. The S-NSSAI combinations that can be selected by the terminal device according to the active network slices of the terminal device are: {S-NSSAI-1, S-NSSAI-3} and {S-NSSAI-1, S-NSSAI-2, S-NSSAI-3}.

According to the network slices supported by the terminal device, the terminal device further selects the combination {S-NSSAI-1, S-NSSAI-2, S-NSSAI-3} from the S-NSSAI combinations {S-NSSAI-1, S-NSSAI-3} and {S-NSSAI-1, S-NSSAI-2, S-NSSAI-3}. Therefore, the terminal device selects the RACH5 parameter corresponding to {S-NSSAI-1, S-NSSAI-2, S-NSSAI-3} to initiate a random access procedure. Thereafter, the network device determines the network slice needed by the terminal device according to the RACH parameter selected by the terminal device, and further selects appropriate AMF entity and SMF entity.

In an implementation of the present disclosure, the network device indicates to the terminal device the S-NSSAI combinations that the network device can support simultaneously, so that the terminal device preferentially selects an RACH resource corresponding to an S-NSSAI combination including the largest number of S-NSSAIs supported by the terminal device among all S-NSSAI combinations, which is beneficial for the network device to determine the network slice needed by the terminal device, thereby providing a more reasonable network slicing service for the terminal device, and further improving the user experience.

In a word, in the case where the network slice information includes S-NSSAI combinations supported by the serving cell, the terminal device performs cell access based on the correspondence relation between the S-NSSAI combinations supported by the serving cell and the RACH parameters and the active network slices of the terminal device; and/or, the terminal device performs cell access based on the correspondence relation between the S-NSSAI combinations supported by the serving cell and the RACH parameters and the network slices supported by the terminal device.

Specifically, taking the network slices supported by the terminal device as an example, the process of determining an RACH parameter by the terminal device is as follows.

In act 1), the terminal device determines an S-NSSAI combination including the largest number of network slices supported by the terminal device among the S-NSSAI combinations supported by the serving cell.

In act 2), in the case where there are multiple combinations with the largest number of data determined in act 1), the terminal device randomly selects one S-NSSAI combination from the S-NSSAI combinations including the largest number of network slices supported by the terminal device.

Alternatively, in the case where there are multiple combinations with the largest number of data determined in act 1), the terminal device selects one S-NSSAI combination from the S-NSSAI combinations including the largest number of network slices supported by the terminal device based on the implementation of the terminal device.

Alternatively, in the case where there are multiple combinations with the largest number of data determined in act 1), the terminal device selects one S-NSSAI combination including the largest number of active network slices of the terminal device from the S-NSSAI combinations including the largest number of network slices supported by the terminal device.

Alternatively, in the case where there are multiple combinations with the largest number of data determined in act 1), the terminal device selects one S-NSSAI combination including a network slice with the highest priority among the active/supported network slices from the S-NSSAI combinations including the largest number of network slices supported by the terminal device.

Alternatively, in the case where there are multiple combinations with the largest number of data determined in act 1), the terminal device selects one S-NSSAI combination including the largest number of active/supported network slices in a specific priority range from the S-NSSAI combinations including the largest number of network slices supported by the terminal device.

In act 3), the terminal device determines, according to the correspondence relation between the S-NSSAI combinations and the RACH parameters, an RACH parameter corresponding to the selected S-NSSAI combination for cell access.

That is, the selected S-NSSAI combination may be determined based at least on the information of active and/or supported network slices of the terminal device.

It should be understood that in various implementations of the present disclosure, sequence numbers of the above various processes do not imply an order of execution of the processes, and the order of execution of the processes should be determined by their functions and internal logics, which should not constitute any limitation on the implementation process of the implementations of the present disclosure.

Figure 5:
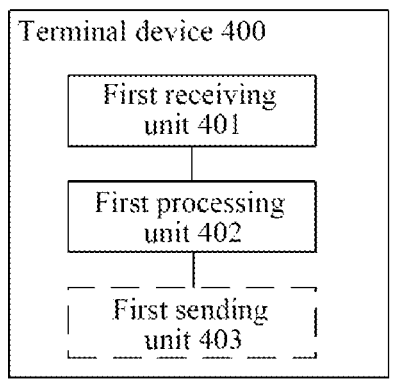
FIG. 5 is a schematic diagram of a composition structure of a terminal device according to an implementation of the present disclosure.

In order to implement the above method for cell access, an implementation of the present disclosure provides a terminal device. A schematic diagram of an optional composition structure of the terminal device 400 is as shown in FIG. 5. The terminal device 400 includes a first receiving unit 401 and a first processing unit 402.

The first receiving unit 401 is configured to receive a correspondence relation between network slice information supported by a serving cell and random access channel (RACH) parameters, the network slice information including S-NSSAI or an S-NSSAI combination.

The first processing unit 402 is configured to perform cell access based on the correspondence relation.

In some implementations, the first receiving unit 401 is further configured to receive the network slice information supported by the serving cell.

In some implementations, in the case where the network slice information includes S-NSSAI, the first processing unit is configured to perform cell access based on the correspondence relation between the S-NSSAI supported by the serving cell and the RACH parameters and active network slices of the terminal device.

In some implementations, the first processing unit 402 is configured to randomly select one active network slice from the active network slices, and determine, based on the correspondence relation between the S-NSSAI supported by the serving cell and the RACH parameters, an RACH parameter corresponding to the selected active network slice, the RACH parameter being used for cell access.

In some implementations, the first processing unit 402 is configured to select one active network slice according to a priority order of the active network slices, and determine, based on the correspondence relation between the S-NSSAI supported by the serving cell and the RACH parameters, an RACH parameter corresponding to the selected active network slice, the RACH parameter being used for cell access.

In some implementations, in the case where the network slice information includes an S-NSSAI combination, the first processing unit 402 is configured to perform cell access based on the correspondence relation between S-NSSAI combinations supported by the serving cell and the RACH parameters and the active network slices of the terminal device.

In some implementations, the first processing unit 402 is configured to determine an S-NSSAI combination including the largest number of active network slices among the S-NSSAI combinations supported by the serving cell.

In some implementations, in the case where there are more than one S-NSSAI combination including the largest number of active network slices, the first processing unit 402 is configured to randomly select one S-NSSAI combination from the S-NSSAI combinations including the largest number of active network slices, and determine an RACH parameter corresponding to the selected S-NSSAI combination based on the correspondence relation between the S-NSSAI combinations supported by the serving cell and the RACH parameters, the RACH parameter being used for cell access.

In some implementations, in the case where there are more than one S-NSSAI combination including the largest number of active network slices, the first processing unit 402 is configured to select one S-NSSAI combination from the S-NSSAI combinations including the largest number of active network slices based on an implementation of the terminal device, and determine an RACH parameter corresponding to the selected S-NSSAI combination based on the correspondence relation between the S-NSSAI combinations supported by the serving cell and the RACH parameters, the RACH parameter being used for cell access.

In some implementations, in the case where there are more than one S-NSSAI combination including the largest number of active network slices, the first processing unit 402 is configured to select one S-NSSAI combination including a network slice with the highest priority from the S-NSSAI combinations including the largest number of active network slices, and determine an RACH parameter corresponding to the selected S-NSSAI combination based on the correspondence relation between the S-NSSAI combinations supported by the serving cell and the RACH parameters, the RACH parameter being used for cell access.

In some implementations, in the case where there are more than one S-NSSAI combination including the largest number of active network slices, the first processing unit 402 is configured to select one S-NSSAI combination including the largest number of network slices in a first priority range from the S-NSSAI combinations including the largest number of active network slices, and determine an RACH parameter corresponding to the selected S-NSSAI combination based on the correspondence relation between the S-NSSAI combinations supported by the serving cell and the RACH parameters, the RACH parameter being used for cell access.

In some implementations, in the case where there are more than one S-NSSAI combination including the largest number of active network slices, the first processing unit 402 is configured to determine a first S-NSSAI combination including the largest number of network slices supported by the terminal device among the S-NSSAI combinations including the largest number of active network slices, and determine an RACH parameter corresponding to the first S-NSSAI combination based on the correspondence relation between the S-NSSAI combinations supported by the serving cell and the RACH parameters, the RACH parameter being used for cell access.

In some implementations, in the case where there are more than one first S-NSSAI combination, the first processing unit 402 is configured to randomly select one of the first S-NSSAI combinations as a second S-NSSAI combination, and determine an RACH parameter corresponding to the second S-NSSAI combination based on the correspondence relation between the S-NSSAI combinations supported by the serving cell and the RACH parameters, the RACH parameter being used for cell access.

In some implementations, in the case where there are more than one first S-NSSAI combination, the first processing unit 402 is configured to select one of the first S-NSSAI combinations as a third S-NSSAI combination based on the implementation of the terminal device, and determine an RACH parameter corresponding to the third S-NSSAI combination based on the correspondence relation between the S-NSSAI combinations supported by the serving cell and the RACH parameters, the RACH parameter being used for cell access.

In some implementations, in the case where there are more than one first S-NSSAI combinations, the first processing unit is configured to select one S-NSSAI combination including a network slice with the highest priority from the first S-NSSAI combinations as a fourth S-NSSAI combination, and determine an RACH parameter corresponding to the fourth S-NSSAI combination based on the correspondence relation between the S-NSSAI combinations supported by the serving cell and the RACH parameters, the RACH parameter being used for cell access.

In some implementations, in the case there are more than one first S-NSSAI combination, the first processing unit 402 is configured to select one S-NSSAI combination including the largest number of network slices in a second priority range from the first S-NSSAI combinations as a fifth S-NSSAI combination, and determine an RACH parameter corresponding to the fifth S-NSSAI combination based on the correspondence relation between the S-NSSAI combinations supported by the serving cell and the RACH parameters, the RACH parameter being used for cell access.

In some implementations, the priorities of the network slices may be determined according to an order in a list of S-NSSAIs corresponding to the network slices; or, the priorities of the network slices are indicated by the non-access stratum of the terminal device; or, the priorities of the network slices are stored in the terminal device; or, the priorities of the network slices are determined according to a service triggering order; or, the priorities of the network slices are determined according to a service characteristic; or, the priorities of the network slices are determined according to an indication of the network device.

In some implementations, the active network slices are indicated by the non-access stratum entity of the terminal device to the access stratum entity of the terminal device.

In some implementations, the active network slices are informed to the access stratum entity by the non-access stratum entity through a service request process.

In some implementations, the active network slices include at least one of: a network slice which the non-access stratum of the terminal device indicates to be activated, a network slice which the non-access stratum of the terminal device indicates to be triggered, and a network slice which the non-access stratum of the terminal device indicates to be needed.

In some implementations, the network slices supported by the terminal device are stored in the terminal device.

In some implementations, the terminal device 400 further includes: a first sending unit 403 configured to report a network slice list to the network device.

In some implementations, the network slice list includes any one of the followings: a network slice included in an intersection of active network slices of the terminal device and network slices supported by the serving cell; a network slice included in an intersection of network slices supported by the terminal device and the network slices supported by the serving cell; a network slice not supported by the serving cell among the active network slices of the terminal device; a network slice not supported by the serving cell among the network slices supported by the terminal device; an active network slice among the network slices supported by the terminal device; and a non-active network slice among the network slices supported by the terminal device.

Figure 6:
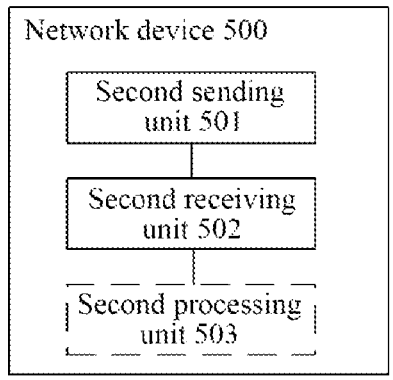
FIG. 6 is a schematic diagram of a composition structure of a network device according to an implementation of the present disclosure.

In order to implement the above method for cell access, an implementation of the present disclosure provides a network device. A schematic diagram of an optional composition structure of the network device 500 is as shown in FIG. 6. The network device 500 includes a second sending unit 501.

The second sending unit 501 is configured to send a correspondence relation between network slice information supported by a serving cell and random access channel (RACH) parameters to a terminal device, the network slice information including S-NSSAI or an S-NSSAI combination.

In some implementations, the second sending unit 501 is further configured to send network slice information supported by the serving cell to the terminal device.

In some implementations, the network device 500 further includes: a second receiving unit 502 configured to receive a network slice list sent by the terminal device.

In some implementations, the network slice list includes any one of the followings: a network slice included in an intersection of active network slices of the terminal device and network slices supported by the serving cell; a network slice included in an intersection of network slices supported by the terminal device and the network slices supported by the serving cell; a network slice not supported by the serving cell among the active network slices of the terminal device; a network slice not supported by the serving cell among the network slices supported by the terminal device; an active network slice among the network slices supported by the terminal device; and a non-active network slice among the network slices supported by the terminal device.

In some implementations, the network device 500 further includes a second processing unit 503.

The second processing unit 503 is configured to determine a network slice needed by the terminal device according to the network slice list and/or a Random Access Channel (RACH) parameter selected by the terminal device.

In some implementations, the second processing unit 503 is further configured to determine an AMF entity for establishing a session connection with the terminal device based on a network slice needed by the terminal device.

An implementation of the present disclosure further provides a terminal device, including: a processor, and a memory configured to store a computer program that is runnable on the processor, wherein the processor is configured to perform acts of the method for cell access performed by the above terminal device when the computer program is run.

An implementation of the present disclosure further provides a network device, including: a processor, and a memory configured to store a computer program that is runnable on the processor, wherein the processor is configured to perform acts of the method for cell access performed by the above network device when the computer program is run.

An implementation of the present disclosure further provides a chip, including: a processor, configured to call and run a computer program from a memory to cause a device installed with the chip to perform the method for cell access performed by the above terminal device.

An implementation of the present disclosure further provides a chip, including: a processor, configured to call and run a computer program from a memory to cause a device installed with the chip to perform the method for cell access performed by the above network device.

An implementation of the present disclosure further provides a storage medium, storing an executable program, when the executable program is executed by a processor, the method for cell access performed by the above terminal device is implemented.

An implementation of the present disclosure further provides a storage medium, storing an executable program, when the executable program is executed by a processor, the method for cell access performed by the above network device is implemented.

An implementation of the present disclosure further provides a computer program product, including computer program instructions that enable a computer to implement the method for cell access performed by the above terminal device.

An implementation of the present disclosure further provides a computer program product, including computer program instructions that enable a computer to implement the method for cell access performed by the above network device.

An implementation of the present disclosure further provides a computer program, which enables a computer to implement the method for cell access performed by the above terminal device.

An implementation of the present disclosure further provides a computer program, which enables a computer to implement the method for cell access performed by the above network device.

Figure 7:
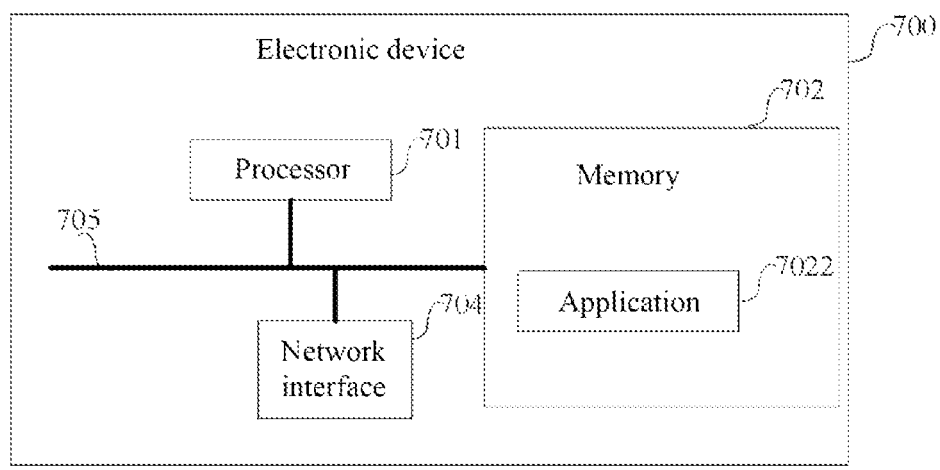
FIG. 7 is a schematic diagram of a hardware composition structure of an electronic device according to an implementation of the present disclosure.

FIG. 7 is a schematic diagram of a hardware composition structure of an electronic device (a terminal device or a network device) according to an implementation of the present disclosure. The electronic device 700 includes: at least one processor 701, a memory 702, and at least one network interface 704. Various components in the electronic device 700 are coupled together by a bus system 705. It may be understood that the bus system 705 is used for implementing connection and communication between these components. In addition to a data bus, the bus system 705 further includes a power bus, a control bus, and a status signal bus. However, for clarity, all kinds of buses are uniformly referred to as the bus system 705 in FIG. 7.

It may be understood that the memory 702 may be a volatile memory or a non-volatile memory, or may include both a volatile memory and a non-volatile memory. The non-volatile memory may be a ROM, a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM). The magnetic surface memory may be a magnetic disk memory or a magnetic tape memory. The volatile memory may be a Random Access Memory (RAM) which serves as an external cache. By way of illustrative but not restrictive explanation, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 702 described in an implementation of the present disclosure is intended to include, but is not limited to, these and any other suitable types of memories.

The memory 702 in an implementation of the present disclosure is configured to store various types of data to support an operation of the electronic device 700. Examples of such data include any computer program for operating on the electronic device 700, such as an application 7022. A program for implementing the method of an implementation of the present disclosure may be contained in the application 7022.

Methods disclosed in the above implementations of the present disclosure may be applied to the processor 701, or implemented by the processor 701. The processor 701 may be an integrated circuit chip with a signal processing capability. In an implementation process, the acts of the methods described above may be accomplished by integrated logic circuits of hardware in the processor 701 or instructions in a form of software. The above processor 701 may be a general purpose processor, a Digital Signal Processor (DSP), or other programmable logic devices, a discrete gate or transistor logic device, a discrete hardware component, etc. The processor 701 may implement or execute various methods, acts, and logical block diagrams disclosed in the implementations of the present disclosure. The general purpose processor may be a microprocessor or any conventional processor or the like. The acts of the methods disclosed in an implementation of the present disclosure may be directly embodied to be executed by a hardware decoding processor, or executed by a combination of hardware in the decoding processor and software modules. The software modules may be located in a storage medium, and the storage medium is located in the memory 702. The processor 701 reads information in the memory 702 and accomplishes the acts of the aforementioned methods in combination with hardware thereof.

In an exemplary implementation, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs or other electronic components, for executing the aforementioned methods.

The present disclosure is described with reference to flowcharts and/or block diagrams of methods, devices (systems), and computer program products according to implementations of the present disclosure. It should be understood that each flow and/or block in the flowchart and/or the block diagram, and combinations of flows and/or blocks in the flowchart and/or the block diagram may be implemented by computer program instructions. These computer program instructions may be provided to a processor of a general purpose computer, a special purpose computer, an embedded processor or another programmable data processing device to produce a machine, such that instructions which are executed by a processor of a computer or another programmable data processing device produce an apparatus for implementing a function specified in one or more flows in a flowchart and/or one or more blocks in a block diagram.

These computer program instructions may also be stored in a computer-readable memory that can direct a computer or another programmable data processing device to operate in a particular manner, such that instructions stored in the computer-readable memory produce an article of manufacture including an instruction apparatus, wherein the instruction apparatus implements a function specified in one or more flows in the flowchart and/or one or more blocks in the block diagram.

These computer program instructions may also be loaded onto a computer or another programmable data processing device to cause a series of operational acts to be performed on the computer or another programmable device to produce computer-implemented processing, such that instructions executed on the computer or the another programmable device provide acts for implementing a function specified in one or more flows in the flowchart and/or one or more blocks in the block diagram.

It should be understood that the terms "system" and "network" in the present disclosure are often used interchangeably herein. The term "and/or" in the present disclosure describes an association relation between associated objects only, indicating that there may be three relations, for example, A and/or B may indicate three cases: A alone, both A and B, and B alone. In addition, the symbol "/" in the present disclosure generally indicates that there is an "or" relationship between the associated objects before and after "/".

The above descriptions are only preferred implementations of the present disclosure, which are not intended to limit the protection scope of the present disclosure. Any modification, equivalent substitution, improvement, etc. made within the spirit and the principle of the present disclosure shall all be contained within the protection scope of the present disclosure.

The invention claimed is:

1. A terminal device, comprising: a processor, a memory configured to store a computer program that is runnable on the processor, and a network interface, wherein when the computer program is run, the processor is configured to receive, through the network interface, a correspondence relation between network slice information supported by a serving cell and Random Access Channel (RACH) parameters, wherein the network slice information comprises Single Network Slice Selection Assistance Information (S-NSSAI) or an S-NSSAI combination; and
perform cell access based on the correspondence relation;
wherein the network slice information comprises S-NSSAI, the processor is configured to perform cell access based on the correspondence relation between the S-NSSAI supported by the serving cell and the RACH parameters and active network slices of the terminal device; or,
wherein the network slice information comprises an S-NSSAI combination, the processor is configured to perform cell access based on the correspondence relation between S-NSSAI combinations supported by the serving cell and the RACH parameters and active network slices of the terminal device;
wherein the active network slices comprise at least one of: a network slice which a non-access stratum of the terminal device indicates to be activated, a network slice which the non-access stratum of the terminal device indicates to be triggered, and a network slice which the non-access stratum of the terminal device indicates to be needed.

2. The terminal device of claim 1, wherein the processor is further configured to receive, through the network interface, the network slice information supported by the serving cell.

3. The terminal device of claim 1, wherein the processor is configured to select randomly one active network slice from the active network slices; and
determine, based on the correspondence relation between the S-NSSAI supported by the serving cell and the RACH parameters, an RACH parameter corresponding to the selected active network slice, wherein the RACH parameter is used for cell access.

4. The terminal device of claim 1, wherein the processor is configured to select one active network slice according to a priority order of the active network slices; and
determine, based on the correspondence relation between the S-NSSAI supported by the serving cell and the RACH parameters, an RACH parameter corresponding to the selected active network slice, wherein the RACH parameter is used for cell access.

5. The terminal device of claim 1 wherein the processor is configured to determine an S-NSSAI combination comprising a largest number of active network slices among the S-NSSAI combinations supported by the serving cell.

6. The terminal device of claim 5, wherein in a case where there are more than one S-NSSAI combination comprising the largest number of active network slices, the processor is configured to select randomly one S-NSSAI combination from S-NSSAI combinations comprising the largest number of active network slices; and
determine an RACH parameter corresponding to the selected S-NSSAI combination based on the correspondence relation between the S-NSSAI combinations supported by the serving cell and the RACH parameters, wherein the RACH parameter is used for cell access.

7. The terminal device of claim 5, wherein in a case where there are more than one S-NSSAI combination comprising the largest number of active network slices, the processor is configured to select one S-NSSAI combination from S-NSSAI combinations comprising the largest number of active network slices based on an implementation of the terminal device, and
determine an RACH parameter corresponding to the selected S-NSSAI combination based on the correspondence relation between the S-NSSAI combinations supported by the serving cell and the RACH parameters, wherein the RACH parameter is used for cell access.

8. The terminal device of claim 5, wherein in a case where there are more than one S-NSSAI combination comprising the largest number of active network slices, the processor is configured to select one S-NSSAI combination comprising a network slice with a highest priority from S-NSSAI combinations comprising the largest number of active network slices; and
determine an RACH parameter corresponding to the selected S-NSSAI combination based on the correspondence relation between the S-NSSAI combinations supported by the serving cell and the RACH parameters, wherein the RACH parameter is used for cell access.

9. The terminal device of claim 8, wherein priorities of the network slices are capable of being determined according to an order in a list of S-NSSAIs corresponding to the network slices;
   or, the priorities of the network slices are indicated by a non-access stratum of the terminal device;
   or, the priorities of the network slices are stored in the terminal device;
   or, the priorities of the network slices are determined according to a service triggering order;
   or, the priorities of the network slices are determined according to a service characteristic;
   or, the priorities of the network slices are determined according to an indication of a network device.

10. The terminal device of claim 5, wherein in a case where there are more than one S-NSSAI combination comprising the largest number of active network slices, the processor is configured to select one S-NSSAI combination comprising a largest number of network slices in a first priority range from S-NSSAI combinations comprising the largest number of active network slices; and
   determine an RACH parameter corresponding to the selected S-NSSAI combination based on the correspondence relation between the S-NSSAI combinations supported by the serving cell and the RACH parameters, wherein the RACH parameter is used for cell access.

11. The terminal device of claim 5, wherein in a case where there are more than one S-NSSAI combination comprising the largest number of active network slices, the processor is configured to determine a first S-NSSAI combination comprising a largest number of network slices supported by the terminal device among S-NSSAI combinations comprising the largest number of active network slices; and
   determine an RACH parameter corresponding to the first S-NSSAI combination based on the correspondence relation between the S-NSSAI combinations supported by the serving cell and the RACH parameters, wherein the RACH parameter is used for cell access.

12. The terminal device of claim 11, wherein in a case where there are more than one first S-NSSAI combination, the processor is configured to select randomly one of first S-NSSAI combinations as a second S-NSSAI combination; and
   determine an RACH parameter corresponding to the second S-NSSAI combination based on the correspondence relation between the S-NSSAI combinations supported by the serving cell and the RACH parameters, wherein the RACH parameter is used for cell access,
   or,
   wherein in a case where there are more than one first S-NSSAI combination, the processor is configured to select one of first S-NSSAI combinations as a third S-NSSAI combination based on an implementation of the terminal device; and determine an RACH parameter corresponding to the third S-NSSAI combination based on the correspondence relation between the S-NSSAI combinations supported by the serving cell and the RACH parameters, wherein the RACH parameter is used for cell access,
   or,
   wherein in a case where there are more than one first S-NSSAI combination, the processor is configured to select one S-NSSAI combination comprising a network slice with a highest priority from first S-NSSAI combinations as a fourth S-NSSAI combination; and determine an RACH parameter corresponding to the fourth S-NSSAI combination based on the correspondence relation between the S-NSSAI combinations supported by the serving cell and the RACH parameters, wherein the RACH parameter is used for cell access,
   or,
   wherein in a case there are more than one first S-NSSAI combination, the processor is configured to select one S-NSSAI combination comprising a largest number of network slices in a second priority range from first S-NSSAI combinations as a fifth S-NSSAI combination; and
   determine an RACH parameter corresponding to the fifth S-NSSAI combination based on the correspondence relation between the S-NSSAI combinations supported by the serving cell and the RACH parameters, wherein the RACH parameter is used for cell access.

13. The terminal device of claim 11, wherein the network slices supported by the terminal device are stored in the terminal device.

14. The terminal device of claim 1, wherein the active network slices are indicated by a non-access stratum entity of the terminal device to an access stratum entity of the terminal device, wherein the active network slices are informed to an access stratum entity by a non-access stratum entity through a service request process.

15. The terminal device of claim 1, wherein the processor is further configured to report, through the network interface, a network slice list to the network device,
   wherein the network slice list comprises any one of:
   a network slice comprised in an intersection of active network slices of the terminal device and network slices supported by the serving cell;
   a network slice comprised in an intersection of network slices supported by the terminal device and network slices supported by the serving cell;
   a network slice not supported by the serving cell among active network slices of the terminal device;
   a network slice not supported by the serving cell among network slices supported by the terminal device;
   an active network slice among network slices supported by the terminal device; and
   a non-active network slice among network slices supported by the terminal device.

16. A network device, comprising:
   a processor, a memory configured to store a computer program that is runnable on the processor, and a network interface, wherein when the computer program is run, the processor is configured to send, through the network interface, a correspondence relation between network slice information supported by a serving cell and Random Access Channel (RACH) parameters to a terminal device, wherein the network slice information comprises Single Network Slice Selection Assistance Information (S-NSSAI) or an S-NSSAI combination, and receive cell access based on the correspondence relation;
   wherein the network slice information comprises S-NSSAI, the processor is configured to receive cell access based on the correspondence relation between the S-NSSAI supported by the serving cell and the RACH parameters and active network slices of the terminal device; or, wherein the network slice information comprises an S-NSSAI combination, the processor is configured to receive cell access based on the correspondence relation between S-NSSAI combinations supported by the serving cell and the RACH parameters and active network slices of the terminal device;

wherein the active network slices comprise at least one of: a network slice which anon-access stratum of the terminal device indicates to be activated, a network slice which the non-access stratum of the terminal device indicates to be triggered, and a network slice which the non-access stratum of the terminal device indicates to be needed.

17. A method for cell access, comprising:

receiving, by a terminal device, a correspondence relation between network slice information supported by a serving cell and Random Access Channel (RACH) parameters, wherein the network slice information comprises Single Network Slice Selection Assistance Information (S-NSSAI) or an S-NSSAI combination; and performing, by the terminal device, cell access based on the correspondence relation;

wherein the network slice information comprises S-NSSAI, performing, by the terminal device, cell access based on the correspondence relation comprises: performing, by the terminal device, cell access based on the correspondence relation between the S-NSSAI supported by the serving cell and the RACH parameters and active network slices of the terminal device; or, wherein the network slice information comprises an S-NSSAI combination, performing, by the terminal device, cell access based on the correspondence relation comprises:

performing, by the terminal device, cell access based on the correspondence relation between S-NSSAI combinations supported by the serving cell and the RACH parameters and active network slices of the terminal device;

wherein the active network slices comprise at least one of: a network slice which anon-access stratum of the terminal device indicates to be activated, a network slice which the non-access stratum of the terminal device indicates to be triggered, and a network slice which the non-access stratum of the terminal device indicates to be needed.

* * * * *